United States Patent [19]

Sutton

[11] 4,049,927
[45] Sept. 20, 1977

[54] TELEPHONE HAND-SET HOLDING MEANS

[76] Inventor: Leslie Joseph Sutton, 46 Leonard Street, Frankston, Victoria, Australia, 3199

[21] Appl. No.: 685,154

[22] Filed: May 11, 1976

[30] Foreign Application Priority Data

May 16, 1975 Australia ................. 1633/75

[51] Int. Cl.² ........................................... H04M 1/12
[52] U.S. Cl. .................................................. 179/150
[58] Field of Search ................. 179/149, 150, 148 R

[56] References Cited
U.S. PATENT DOCUMENTS 2,435,816  2/1948  Anderson ............................. 179/150

FOREIGN PATENT DOCUMENTS 141,155  5/1951  Australia ............................. 179/149

Primary Examiner—William C. Cooper
Attorney, Agent, or Firm—Gerald J. Ferguson, Jr.; Joseph J. Baker

[57] ABSTRACT

A telephone hand-set holding means is disclosed for supporting and maintaining a telephone hand-set relative to a table top, desk, or floor, or like surface, in a convenient user position adjacent to the mouth and ear of a telephone user, thereby leaving the user's hands free. One embodiment fits about a telephone and has a means to engage the telephone switch hooks to permit the ringing of the telephone for incoming calls and to disengage therefrom to permit user conversation.

6 Claims, 4 Drawing Figures

4,049,927

TELEPHONE HAND-SET HOLDING MEANS

FIELD OF THE INVENTION

The present invention relates to a telephone hand-set holding means, and relates particularly, but not exclusively, to such a means which supports a conventional hand-set (incorporating a mouth piece and ear piece in the one unit).

In modern society, the telephone is a vital part of both commercial and private life, and many businesses depend to a great extent on the telephone to receive and transmit information, and to carry out commercial enterprises. It is frequently necessary when speaking on the telephone to take notes or look through files. These operations often entail the use of both hands, with the result that the speaker has to balance the hand-set on his shoulder or to interrupt his conversation and put the hand-set on the desk.

DESCRIPTION OF THE PRIOR ART

One of the prior art solutions to this problem is the provision of a semi-circular attachment to the outer surface of the mid-section of the hand-set to enable the caller to more readily balance the hand-set on his shoulder. Another solution provides a clip to hold the hand-set on the shoulder. These solutions are not entirely satisfactory, and still mean that the speaker is obliged to sit in a hunched position to retain the hand-set on his shoulder, with resultant discomfort and limitation to movement.

BRIEF SUMMARY OF THE INVENTION

According to the invention there is provided a telephone hand-set holding means for supporting a handset, whereby listening and speaking can be effected without requiring the hand-set to be held by the user, said telephone hand-set holding means comprising a support member for receiving and supporting the handset and a base member connected with the support member, the support member and base member being of an overall length whereby such a hand-set will be maintained in operative user position with respect to a table top, floor or like surface.

In a preferred embodiment there is provided a telephone hand-set, supporting means for supporting a hand-set, whereby listening and speaking can be effected without requiring the hand-set to be held by the user, said telephone hand-set holding means comprising a support member for receiving and supporting the hand-set, and a base member, the support being pivoted on the base member, the support member being moveable from a first position to a second position, the first position being where the support member bears on the cradle of a telephone body thereby depressing the switch hooks and whereby the telephone is in a condition to receive incoming dialling signals, the second position being where the support member does not bear on the cradle of the telephone body, thus permitting the switch hooks to rise, the telephone thereby being in a condition to enable transmission of outgoing and incoming conversation signals, the base member being mountable under a base of a telephone body and whereby when the support member is in the second position, the hand-set and hand-set holding means is supported and maintained relative to the base and is of such a length as to be in a position adjacent to the mouth and ear of the telephone user, thereby leaving the user's hands free.

BRIEF DESCRIPTION OF THE DRAWINGS

In order that the invention can be more clearly ascertained, the construction of a preferred embodiment, which has the alternative feature of being moveable from a first to a second position, will now be described with reference to the accompanying drawings:

FIG. 4 is a cross sectional view illustrating a modification of the invention.

DETAILED DESCRIPTION

Figure 1:
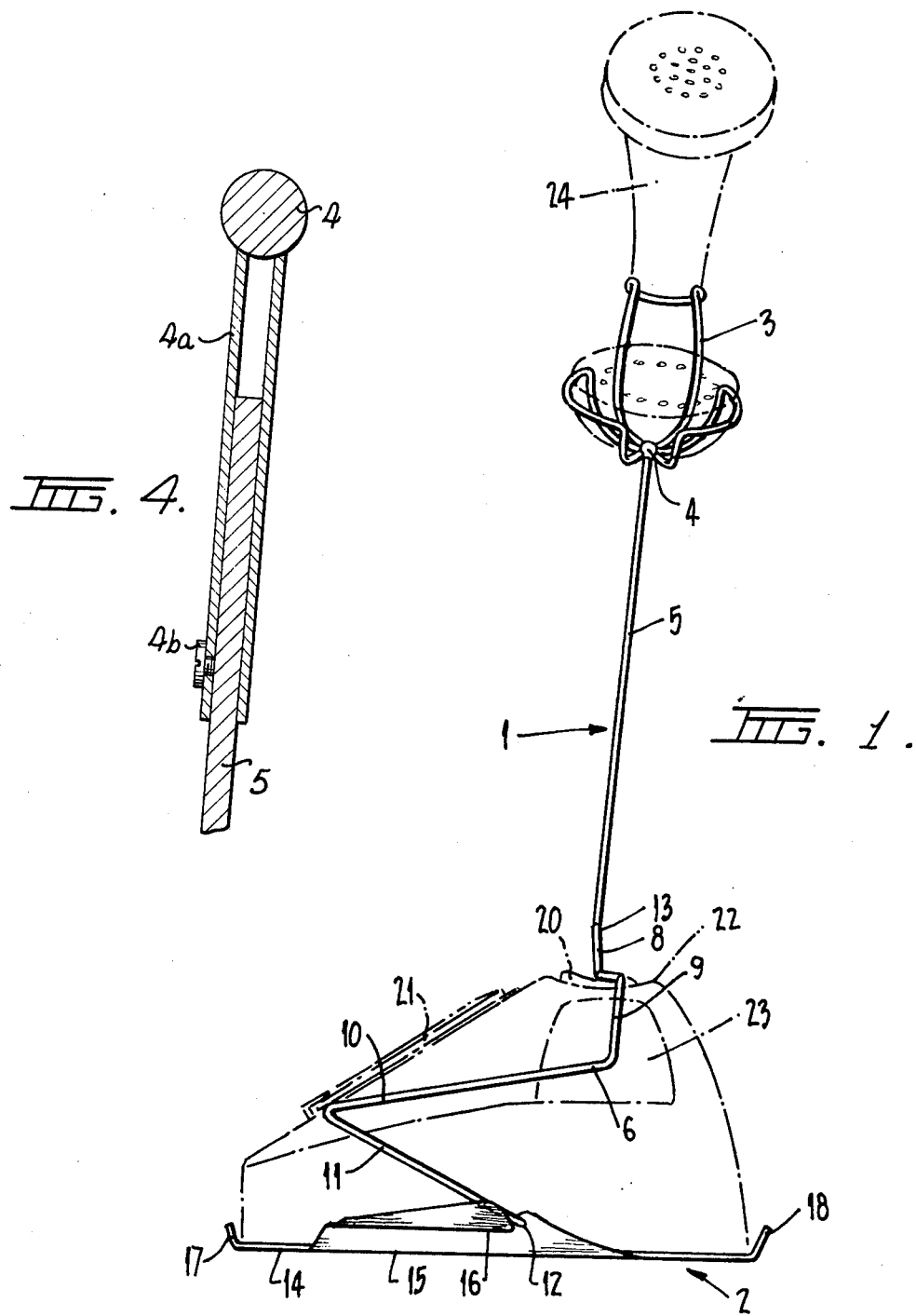
FIG. 1 is a side view showing the support member in the first position.
Figure 2:
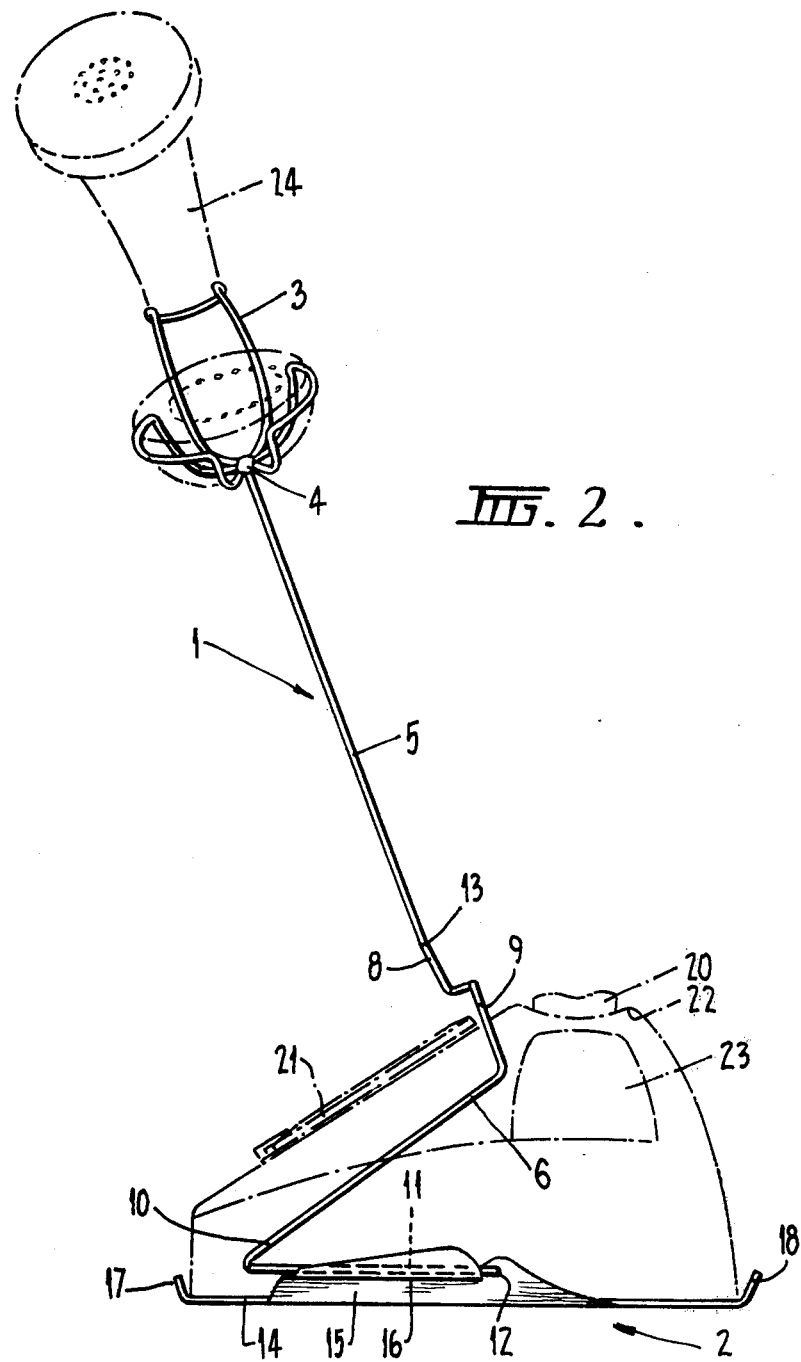
FIG. 2 is a side view showing the support member in the second position.
Figure 3:
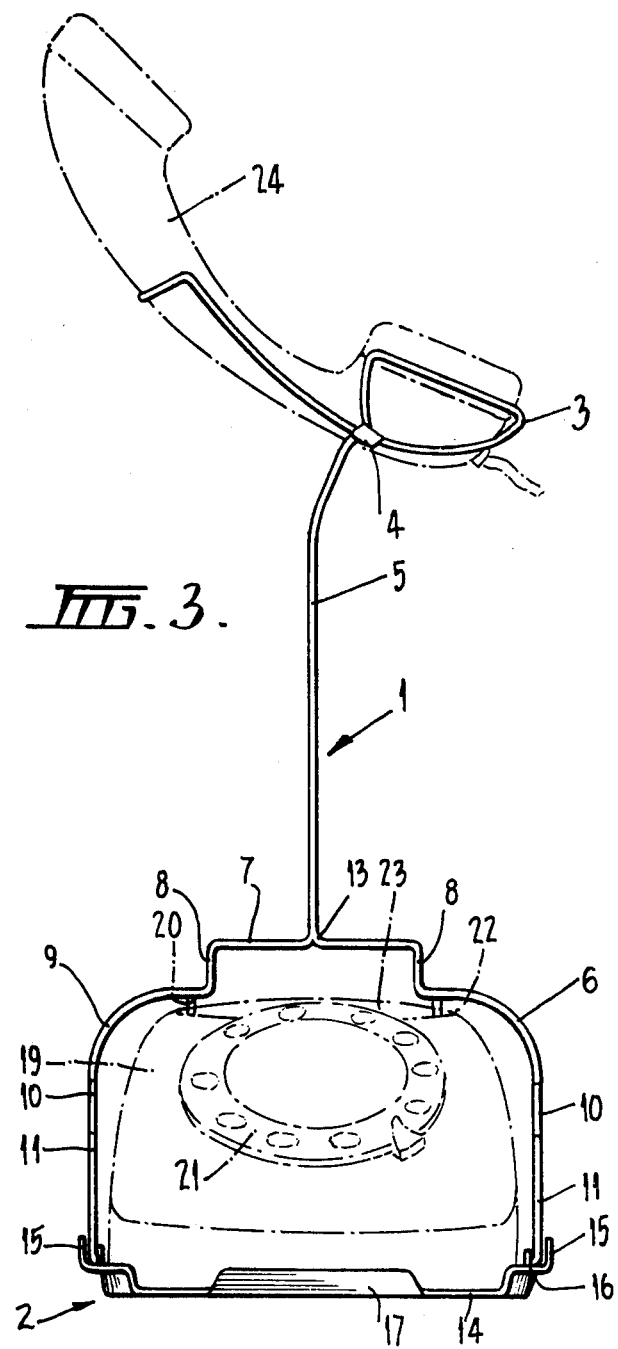
FIG. 3 is a front view showing the support member in the first position.

FIGS. 1, 2, and 3 show support member 1 and base member 2. Support member 1 comprises holder 3, arm 5 and lower member 6 which constitute a support means for a hand-set 24. The holder 3 and arm 5 are connected by connecting means 4. Arm 5 terminates with a lower member 6 at region 13. Lower member 6 comprises a horizontal section 7, and downwardly curving sections 8, with curved side sections 9, the upper portion of which bears on switch hooks 20, (shown in FIG. 3), and forwardly directed side sections 10, and rearwardly directed side sections 11 articulated to base member 2 at 12 (shown in FIGS. 1 and 2).

Base member 2 comprises a base plate 14, upturned side portions 15, with front upturned portion 17 and similar upturned back portion 18. The side sections 15 includes rests 16 for the side sections 11 (as seen in FIG. 3).

FIGS. 1, 2 and 3 further show a standard telephone body 19, with a cradle 23 and switch hooks 20, a dial 21, and a hand-set 24. The cradle 23 has outermost projections 22 which hold hand-set in place to enable the switch hooks 20 to remain depressed when the telephone is not in use.

FIG. 1 shows switch hooks 20 in a depressed position, whereby the telephone may receive incoming calls. In FIG. 2, the switch hooks 20 are in an upwardly extended position thus enabling the dial 21 to be used, and permitting telephone conversation.

FIG. 2 shows the support member comprising holder 3, arm 5 and lower member 6, in a forward position, i.e. a second position. The lower member 6 is maintained in the second position by permitting rearwardly pointing side members 11 to rest in the rests 16, thus preventing the further forward movement of the lower member 6.

The embodiment shown in FIGS. 1 to 3 may be varied in many ways. For example, forwardly directed section 10 and rearwardly directed section 11 can be replaced by a straight side section continuous with curved side section 9, (which bears on switch hooks 20), and which is articulated to base 2 at 12, and abuts against a suitable rest or stop means.

Further, as shown in FIG. 4, connecting means 4 may be extended as a hollow tubular member 4a, within which arm 5 can be slidably inserted. At the lower end of such a tubular member may be placed an adjusting screw 4f or similar means which permits the tubular member 4a to be fixed in relation to arm 5.

This embodiment would allow hand-set 24 in holder 3 to be fixed and maintained at a suitable height and angle for the user. As the holder 3 (and tubular member) may be completely rotated, the hand-set may be held in the correct position whether the telephone be on the left or right hand side of the user.

The embodiment in FIGS. 1 to 3 may of course be modified in many other ways. The articulation at 12 may function in a frictional manner, or may be spring loaded, or may function on any other conventional manner. Lower member 6 may be articulated on one side only, wherein the sections 7, 8, 9, 10 and 11 of lower member 6 on the other side being dispensed with entirely. Sections 7, 8, 9, 10 and 11 of lower member 6 may be replaced by a single curved member on one or both sides which is slotted at the inwardly curving top section thereof to move over the projection 22 of the telephone body, and which may be spring hinged, or extendable. Lower member 6 may be articulated or hinged within itself, and may further be adjustable or extendible so that the hand-set holder is readily able to be used on telephone bodies of varying shapes and sizes. Further, rests 16 in lateral projections 15 in the base member 2 may be replaced by suitable stop means to maintain the lower member 6 in the second position.

Preferably, horizontal section 7 is rearwardly curved so as to enable the dial to be used without causing obstruction to the dial when the support means is in the second position.

Preferably, a connecting means 4 or tubular member between holer 3 and arm 5 is capable of turning, rotating or swivelling. Arm 5 may be flexible, and also be extendible. Arm 5 may also be capable of turning, rotating, or swivelling at region 13.

Lower member 6 and base member 2 may be modified so that the lower member 6 can be attached to the base of the body of the telephone my any suitable means. For example, lower member 6 may be modified to compromise one or two curved side members to be attached to the base of the body of the telephone by means of a base member 2 comprising a shaped or flexible band fitting firmly around the sides at the base of the telephone body, and being held in position by adjustable fastening means, thus eliminating the need for base plate 14 as shown in the drawings.

Alternatively, the lower members 6 may terminate in two projections which fit into depressions formed in each side of the base of the telephone body casing itself.

Where base plate 14 is used, this may comprise a flat, contoured, or moulded base plate 14 which fits under the base of the telephone. Base plate 14 may further have upwardly extending side projections on one or all of its sides to prevent the telephone from slipping off. Alternatively the base plate 14 may have holes therein through which the feet of the telephone may protrude. Where the base plate 14 is contoured, this member may be equipped with depressions to receive therein the feet of the telephone, and may further comprise raised and upwardly pointing projections around one or more of the sides of the telephone to maintain the base plate 14 under the telephone.

Further, the base plate 14 may be extended laterally and frontwards of the telephone body to allow note paper and writing means to be rested thereon or attached thereto.

A variation of an alternative embodiment of the invention provides a holding means wherein lower member 6 of the support means 1 is modified and hinged for swinging sideways on one side only of the telephone body, and equipped with a projection which, in the first position projects inwardly from the lower member 6 and bears on the telephone cradle 23, thus depressing the switch hooks 20. In the second position, the lower member 6 is pulled outwardly and sideways from the telephone body 19 so that the projection no longer bears on the telephone cradle 23 and the switch hooks are in an upwardly extended position. Alternatively, the projection may be hinged on the lower member 6 so that it can be manually lowered onto the telephone cradle 23 or raised therefrom.

Further, the lower member 6 may be so adapted that it can be pushed backwards, rather than pulled forward, in order to move it from the first position where the switch hooks 20 are depressed to a second position where the switch hooks 20 are in an upwardly extended position. Rests 16 (or some suitable stop means) are then placed to the rear of the points of articulation at 12. This arrangement has the advantage of ensuring easy access to the dial 24.

In another embodiment, the invention (as described above) provides a supporting means 1, comprising a holder 3 for the hand-set, and an arm 5, which is not adapted to bear on and depress the switch hooks 20, and a base member 2. This embodiment may be attached to the telephone as described above by means of the plate 14, or may be free standing.

In use of this latter embodiment, when the telephone rings, the hand-set is lifted, and if it is necessary to take notes or have both hands free to look through files, for example, the hand-set is placed in holder 3, and the holding means is then pulled into a convenient position in relation to the ear and mouth of the user so as to leave the user's hands free. When the conversation has terminated, the hand-set is removed from holder 3 and replaced on the telephone cradle 23.

In a freestanding embodiment, the base member 2 may comprise a conventional weighted stand to ensure that the holding means does not overbalance on the table top, desk or floor when the hand-set is placed in holder 3. Alternatively, the base member 2 may be flattened as described above to allow note paper and writing means to be rested thereon or attached thereto.

The invention may optionally incorporate in a known manner or means a reading light to be attached to the holding means, in holder 3, arm 5, or base member 2, where most convenient. This light may, for example, be activated by a conventional switch, or by a button in holder 3 which is depressed when the hand-set 24 is placed therein.

The foregoing embodiments may be formed of metal, wood, or a plastics material, or combinations thereof, or any other suitable material.

The present invention would find application not only in the office, but also in police stations and hospitals, and in the home. Some embodiments may also be suitable for use by handicapped persons, including limbless or partially limbless persons and bedridden persons. The present invention could be used on telephone with pushbutton dialling systems to enable armless persons to make and receive telephone calls.

These and other modifications may be made without departing from the ambit of the invention, the nature of which is to be determined from the foregoing description, and it will be appreciated that the invention is not restricted to the embodiments herein described. It is to be understood that the invention includes any modification or embodiments shown or implied which would be apparent to a person skilled in the field of this invention.

The claims defining the invention are as follows:

1. A telephone hand-set supporting device for supporting a hand-set, whereby listening and speaking can be effected without requiring the hand-set to be held by the user, said hand-set being usable with a telephone body having a cradle disposed at the upper part of said body for conventionally receiving said hand-set and switch hooks disposed near said cradle which when depressed permit the receipt of ringing signals and when released enable the transmission of outgoing and ingoing conversation signals, said telephone handset supporting device comprising a support member for receiving and supporting the hand-set at a point above the telephone body, and a base member for receiving said telephone body, the support member being pivoted on the base member at a point below said switch hooks, the support member being moveable from a first position to a second position, the support member bearing on the cradle of the telephone body in said first position thereby depressing the switch hooks so that the telephone is in a condition to receive said ringing signals, the support member not bearing on the cradle of the telephone body in said second position thus permitting the switch hooks to release, the telephone thereby being in a condition to enable said transmission of outgoing and incoming conversation signals, the base member being mountable under the base of the telephone body whereby when the support member is in the second position, the hand-set and hand-set supporting device is supported and maintained relative to the base of the telephone body and is of such a length as to be in a position adjacent to the mouth and ear of the telephone user, thereby leaving the user's hands free.

2. A telephone hand-set holding means according to claim 1 wherein the support member comprises a holder for the telephone hand-set, an arm portion extending therefrom, and a lower portion in which the arm portion terminates, the lower portion extending over the telephone body, and wherein the lower portion is pivoted to the base member.

3. A telephone hand-set holding means according to claim 2 wherein the base member has stop means for limiting the amount of forward or rearward swinging movement of the support member when in a second position.

4. A telephone hand-set holding means as claimed in claim 2 including means for rotatably mounting said holder with respect to the arm portion, means for telescopically extending said holder with respect to the arm portion, and locking means for locking said holder in a predetermined position with respect to said arm portion.

5. A telephone hand-set holding means according to claim 3 wherein the support member is of a rod-like material, and the base member is a sheet material selected from the group consisting of wood, plastics and metal.

6. A telephone hand-set holding means according to claim 4 wherein the support member is of a rod-like material, and the base member is a sheet material selected from the group consisting of wood, plastics and metal.

* * * * *